(12) United States Patent
Ishigami et al.

(10) Patent No.: US 9,463,494 B2
(45) Date of Patent: Oct. 11, 2016

(54) CLEANING DEVICE OF POROUS PLATE FOR NUCLEAR POWER

(71) Applicant: MITSUBISHI HEAVY INDUSTRIES, LTD., Tokyo (JP)

(72) Inventors: Yoichi Ishigami, Tokyo (JP); Masato Yamasaki, Tokyo (JP); Yoshitake Kasubata, Tokyo (JP); Yuichi Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/387,724

(22) PCT Filed: Mar. 5, 2013

(86) PCT No.: PCT/JP2013/055996
§ 371 (c)(1),
(2) Date: Sep. 24, 2014

(87) PCT Pub. No.: WO2013/146120
PCT Pub. Date: Oct. 3, 2013

(65) Prior Publication Data
US 2015/0075572 A1    Mar. 19, 2015

(30) Foreign Application Priority Data

Mar. 29, 2012 (JP) .................................. 2012-077765

(51) Int. Cl.
| | |
|---|---|
| *B08B 3/12* | (2006.01) |
| *G21C 19/20* | (2006.01) |
| *B08B 3/10* | (2006.01) |
| *G21C 17/017* | (2006.01) |
| *G21D 1/00* | (2006.01) |

(52) U.S. Cl.
CPC . *B08B 3/12* (2013.01); *B08B 3/10* (2013.01); *G21C 17/017* (2013.01); *G21C 19/207* (2013.01); *G21D 1/006* (2013.01); *Y02E 30/40* (2013.01)

(58) Field of Classification Search
CPC ......... B08B 3/10; B08B 3/12; G21C 17/017; G21C 19/207; G21D 1/006
See application file for complete search history.

(56) References Cited

U.S. PATENT DOCUMENTS

| | | | |
|---|---|---|---|
| 5,090,432 A | 2/1992 | Bran | |
| 5,593,505 A * | 1/1997 | Erk | ........................... B08B 3/10 134/1.3 |

(Continued)

FOREIGN PATENT DOCUMENTS

| | | |
|---|---|---|
| EP | 0 615 792 A1 | 9/1994 |
| JP | 8-10730 A | 1/1996 |

(Continued)

OTHER PUBLICATIONS

Written Opinion of the International Search Report dated Jun. 4, 2013, issued in corresponding application No. PCT/JP2013/055996.

(Continued)

*Primary Examiner* — Michael Barr
*Assistant Examiner* — Benjamin L Osterhout
(74) *Attorney, Agent, or Firm* — Westerman, Hattori, Daniels & Adrian, LLP (57) ABSTRACT

A cleaning device of a porous plate for nuclear power including: cleaning tanks (72, 73) that is capable of storing a cleaning liquid therein and is capable of housing the porous plate (43) in an upright state; a rotation device (84) that is capable of rotating the porous plate (43) within the respective cleaning tanks (72, 73); and an ultrasonic wave oscillation device (111) that irradiates the porous plate (43) within the cleaning tanks (72, 73) with ultrasonic wave. Thus, it is possible to efficiently remove the adhered foreign substances.

5 Claims, 10 Drawing Sheets

(56) References Cited

U.S. PATENT DOCUMENTS

| | | | | |
|---|---|---|---|---|
| 5,672,212 | A | * | 9/1997 | Manos ............ H01L 21/67023 134/1.3 |
| 5,698,040 | A | * | 12/1997 | Guldi ............ H01L 21/67057 134/1.3 |
| 5,816,274 | A | * | 10/1998 | Bartram .................... B08B 3/10 134/140 |
| 6,119,366 | A | * | 9/2000 | Ferrell ............ H01L 21/67034 34/340 |
| 6,554,003 | B1 | * | 4/2003 | Birang ...................... B08B 3/12 134/1.3 |
| 6,572,709 | B1 | | 6/2003 | Kaneda et al. |
| 2001/0013355 | A1 | * | 8/2001 | Busnaina .................. B08B 3/12 134/1.3 |
| 2001/0015211 | A1 | * | 8/2001 | Schuler .................... B08B 3/12 134/1.3 |
| 2002/0139390 | A1 | * | 10/2002 | Okano ...................... B08B 3/10 134/1.3 |
| 2002/0166569 | A1 | * | 11/2002 | Harvey .................. B08B 3/102 134/1.3 |
| 2005/0003737 | A1 | * | 1/2005 | Montierth ............. A61B 8/546 451/5 |
| 2007/0144556 | A1 | * | 6/2007 | Bran ........................ B08B 3/12 134/1 |
| 2008/0142055 | A1 | * | 6/2008 | Yin .......................... B08B 3/12 134/95.1 |

FOREIGN PATENT DOCUMENTS

| | | |
|---|---|---|
| JP | 2001-269632 A | 10/2001 |
| JP | 2003-504204 A | 2/2003 |
| JP | 2007-147138 A | 6/2007 |
| JP | 2010-153541 A | 7/2010 |
| WO | 00/27552 A1 | 8/2000 |

OTHER PUBLICATIONS

International Search Report dated Jun. 4, 2013, issued in corresponding application No. PCT/JP2013/055996.

English translation of Written Opinion of the International Search Report dated Jun. 4, 2013, issued in corresponding application No. PCT/JP2013/055996 (4 pages).

Office Action dated Mar. 29, 2016, issued in counterpart Japanese Patent Application No. 2012-077765, with English translation. (5 pages).

Extended European Search Report dated Oct. 26, 2015, issued in counterpart EP application No. 13768720.8. (7 pages).

* cited by examiner

CLEANING DEVICE OF POROUS PLATE FOR NUCLEAR POWER

FIELD

The present invention relates to a cleaning device of a porous plate for nuclear power that cleans a tube support plate for supporting a heat exchanger tube, for example, in a steam generator used as a heat exchanger in a nuclear power plant.

BACKGROUND

For example, in a pressurized water reactor (PWR), light water is used as reactor coolant and neutron moderator to be high-temperature and high-pressure water that does not boil over the entire reactor internal, the high-temperature and high-pressure water is sent to the steam generator to generate steam by heat exchange, and the steam is sent to a turbine generator to generate electricity. Moreover, the steam generator is configured so that a plurality of heat exchanger tubes having an inverted U-shape is provided inside, end portions of each heat exchanger tube are supported by a tube sheet, and an inlet side channel head and an outlet side channel head of primary cooling water are formed at a lower end portion of a body portion. Further, an inlet portion of secondary cooling water is provided in the body portion to be located above a tube bundle shroud, a gas-water separator and a moisture separator are vertically arranged side by side, and a steam outlet is provided above the gas-water separator and the moisture separator.

As such a steam generator, for example, there is a steam generator described in Patent Literature 1 below.

CITATION LIST

Patent Literature

Patent Literature 1: Japanese Laid-open Patent Publication No. 2007-147138

SUMMARY

Technical Problem

In the above-described steam generator, the multiple heat exchanger tubes provided within the body portion are supported by the plurality of tube support plates and the tube sheet. By inserting the heat exchanger tubes into mounting holes formed in large numbers, the tube support plate supports the multiple heat exchanger tubes to prevent vibration. Moreover, since the tube support plate is manufactured so that the multiple mounting holes are machined on a disk member, cutting oil, chips, dust and the like adhere to the tube support plate, and it is not possible to directly mount the tube support plate to the body portion as it is, from the viewpoint of foreign substance management or subsidiary material management.

The present invention has been made to solve the above-described problems, and an object thereof is to provide a cleaning device of a porous plate for nuclear power that can efficiently remove the adhered foreign substances.

Solution to Problem

According to an aspect of the present invention, a cleaning device of a porous plate for nuclear power includes: a cleaning tank that is capable of storing a cleaning liquid therein and is capable of housing the porous plate in an upright state; a rotation device that is capable of rotating the porous plate within the cleaning tank; and an ultrasonic wave oscillation device that irradiates the porous plate within the cleaning tank with ultrasonic waves.

Therefore, the porous plate is rotated by the rotation device in an upright state by being immersed in the cleaning liquid in the cleaning tank, and by irradiating with ultrasonic waves from the ultrasonic wave oscillation device, the adhered cutting oil, chips, dust and the like are removed. Thus, it is possible to efficiently remove the adhered foreign substances.

Advantageously, in the cleaning device, the ultrasonic wave oscillation device includes an ultrasonic transducer that is disposed on an inner wall surface of the cleaning tank to face one of a front part and a back part of the porous plate, and a reflecting plate that is disposed on the inner wall surface of the cleaning tank to face the other of the front part or the back part, and the ultrasonic wave oscillation device is provided to be movable along a vertical direction by a moving device.

Thus, since the porous plate is irradiated with ultrasonic waves from the ultrasonic transducer moving in the vertical direction while rotating, in the upright state of being immersed in the cleaning liquid in the cleaning tank, and the porous plate is irradiated with ultrasonic waves reflected from the reflecting plate, it is possible to remove cutting oil, chips, dust and the like over the entire surface of the porous plate, to improve the cleaning efficiency, and to miniaturize the ultrasonic transducers, thereby being able to miniaturize the device and reduce the cost.

Advantageously, in the cleaning device, a plurality of drive rollers forming the rotation device is provided at a lower portion of the interior of the cleaning tank, and a plurality of support rollers configured to prevent collapse of the porous plate is provided at an upper portion of the interior of the cleaning tank.

Thus, since the porous plate is rotatable by a plurality of drive rollers provided at the lower portion, and collapse is prevented by a plurality of support rollers provided at the upper portion, it is possible to safely and efficiently clean the porous plate.

Advantageously, in the cleaning device, the support rollers include a first pair of guide rollers that supports the front part and the back part of the porous plate, and a second pair of guide rollers that supports an outer peripheral end surface of the porous plate.

Thus, since the front part and the back part of the porous plate are supported by the first guide roller, and the outer peripheral end surface thereof is supported by the second guide roller, it is possible to safely support the porous plate.

Advantageously, in the cleaning device, a heating device configured to heat the cleaning liquid is provided at the lower portion of the interior of the cleaning tank.

Therefore, by heating the cleaning liquid in the cleaning tank using a heating device, the cleaning effect of the cleaning liquid is improved, and since the cleaning liquid is stirred by convection action, it is also possible to improve the cleaning effect of the porous plate in this respect.

Advantageously, in the cleaning device, a supply path configured to supply the cleaning liquid to the interior of the cleaning tank, and a discharge path configured to discharge the cleaning liquid within the cleaning tank.

Therefore, it is possible to supply the cleaning liquid to the cleaning tank from the supply path and discharge the cleaning liquid in the cleaning tank from the discharge path, thereby being able to improve the cleaning effect by circulating the cleaning liquid, and to suppress the contamination of the cleaning liquid in the cleaning tank.

Advantageous Effects of Invention

According to the cleaning device of the porous plate for nuclear power of the present invention, since the cleaning tank that is capable of storing the cleaning liquid therein and housing the porous plate in a upright state, a rotation device that is capable of rotating the porous plate in the cleaning tank, and an ultrasonic wave oscillation device that irradiates the porous plate in the cleaning tank with ultrasonic waves, it is possible to efficiently remove the foreign substances such as adhered cutting oil, chips, and dust.

BRIEF DESCRIPTION OF DRAWINGS

FIG. 10-1 is a plan view illustrating a prepared hole of a tube support plate.

FIG. 10-2 is a plan view illustrating a prepared hole and an R chamfered portion of the tube support plate.

FIG. 10-3 is a plan view illustrating a broached hole of the tube support plate.

DESCRIPTION OF EMBODIMENTS

Preferred embodiments of the cleaning device of the porous plate for nuclear power of the present invention will be described below in detail with reference to the accompanying drawings. In addition, the present invention is not limited to the embodiments, and when there is a plurality of embodiments, a configuration obtained by combining each embodiment may be included.

Examples

Figure 1:
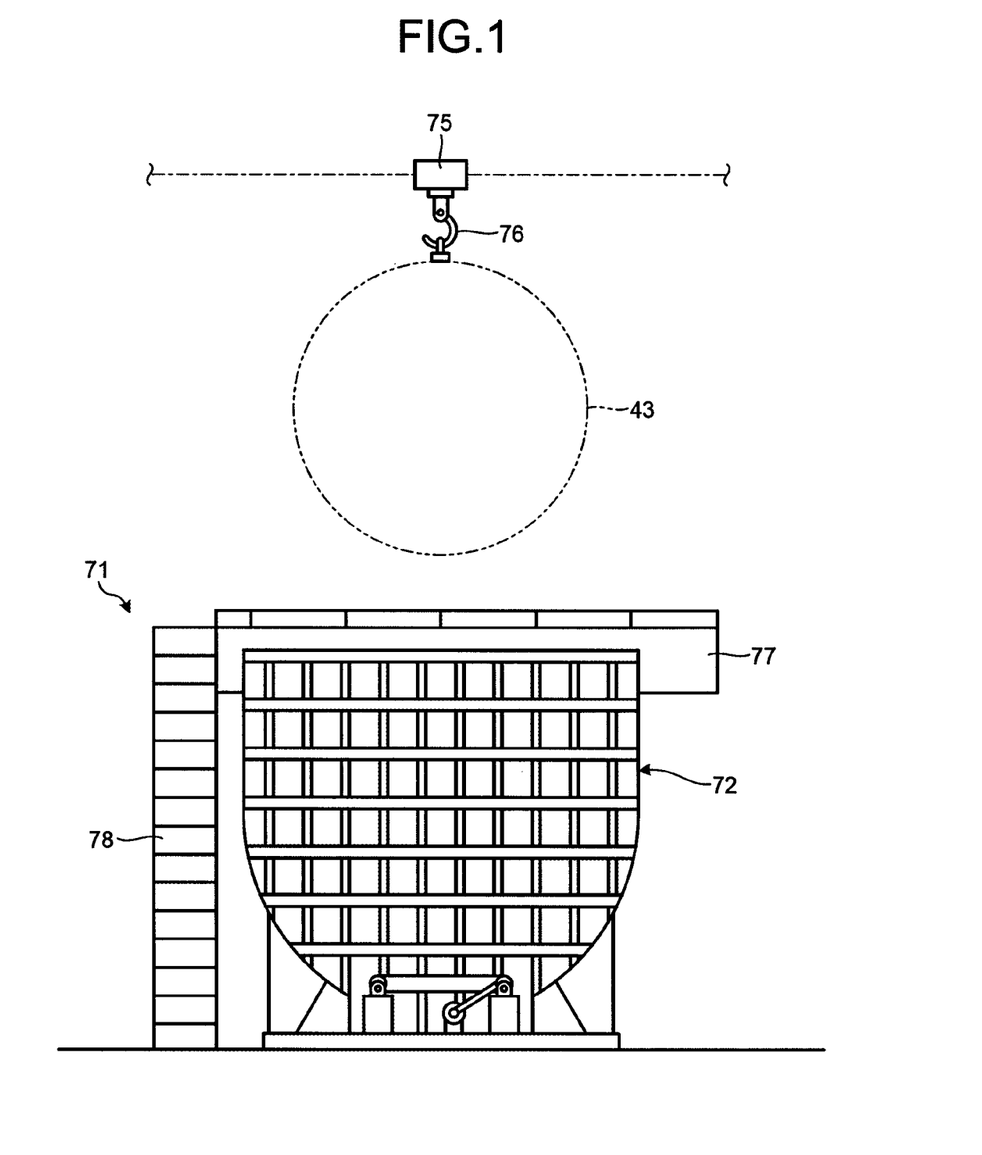
FIG. 1 is a front view of a cleaning device of a porous plate for nuclear power according to an embodiment of the present invention.
Figure 2:
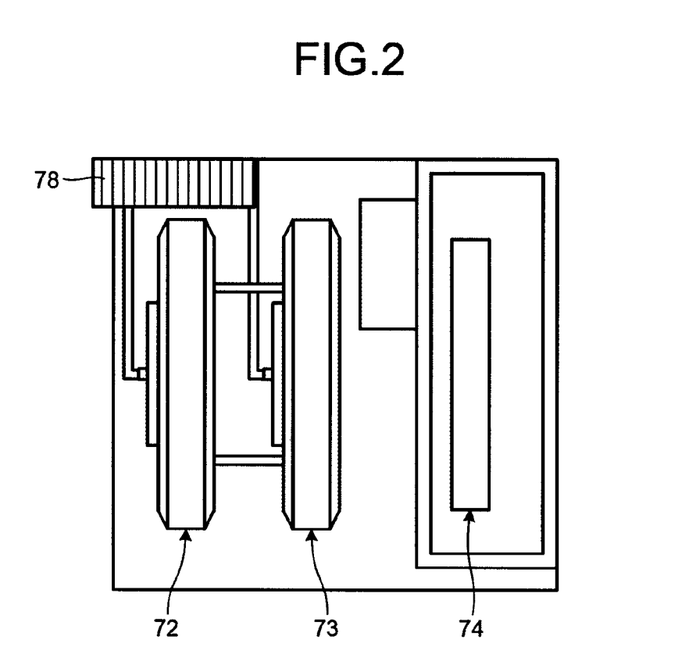
FIG. 2 is a plan view of the cleaning device of the porous plate for nuclear power of this embodiment.
Figure 3:
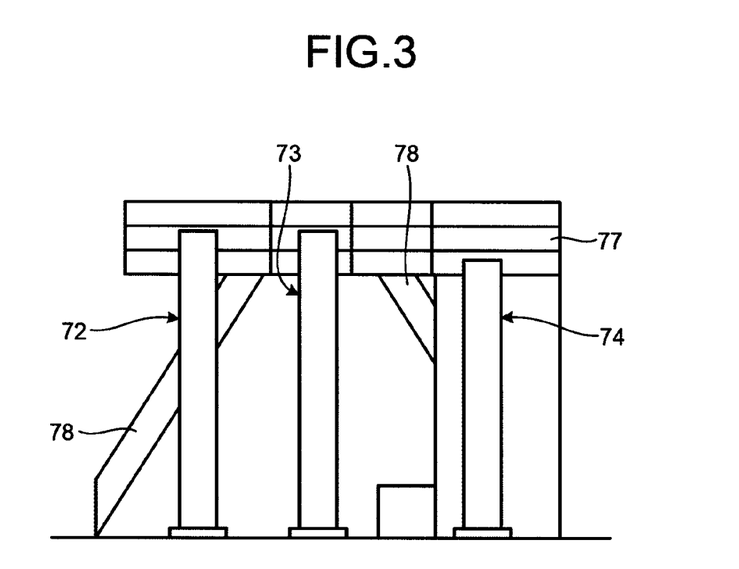
FIG. 3 is a side view of the cleaning device of the porous plate for nuclear power of this embodiment.
Figure 4:
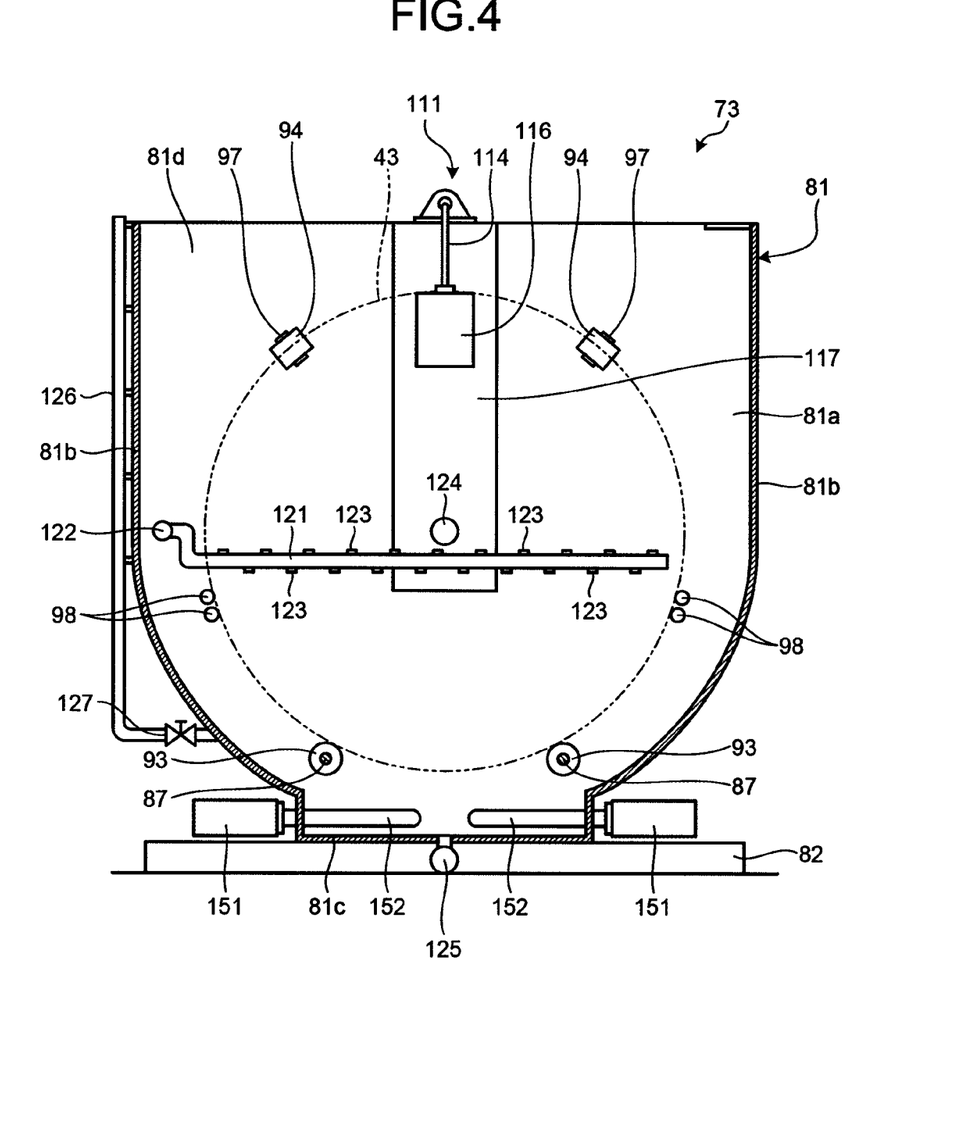
FIG. 4 is a cross-sectional view of the cleaning tank in the cleaning device of the porous plate for nuclear power of this embodiment.
Figure 5:
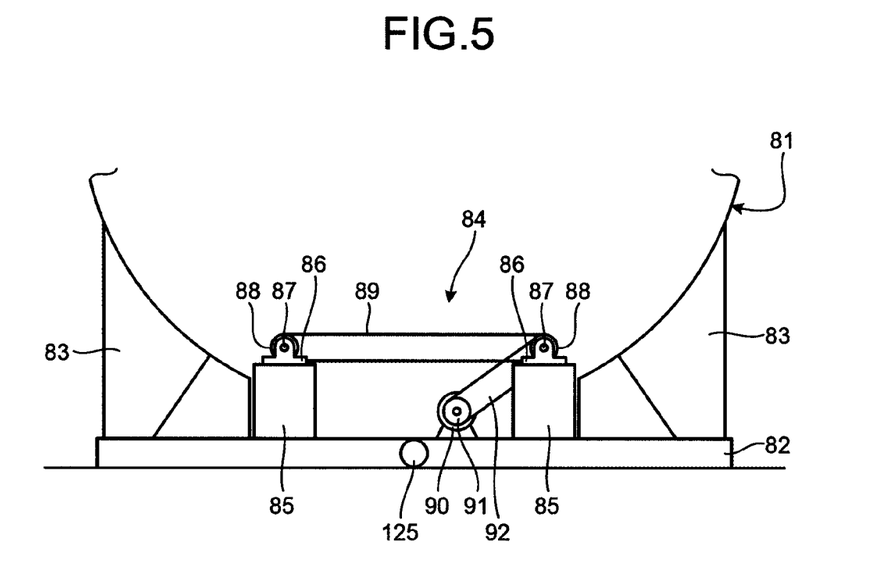
FIG. 5 is a front view illustrating a rotation device of the cleaning tank.
Figure 6:
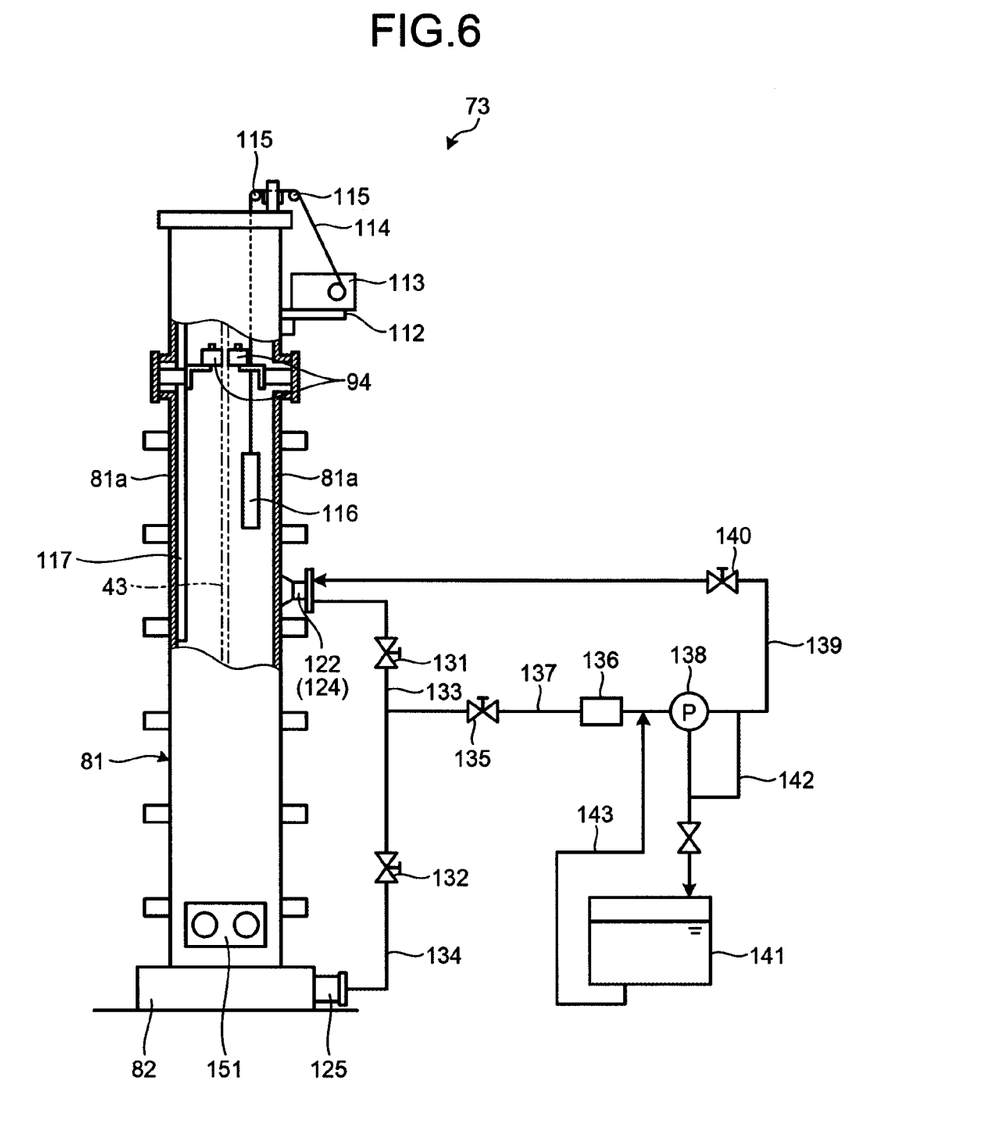
FIG. 6 is a side view of the cleaning tank.
Figure 7:
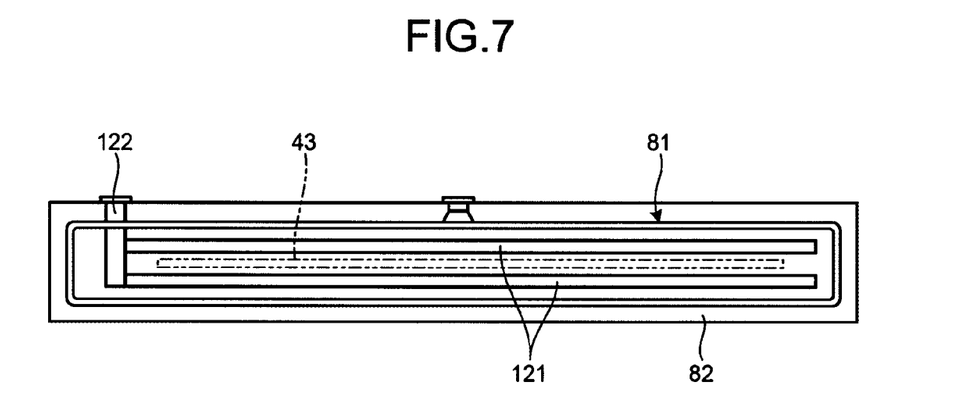
FIG. 7 is a plan view of the cleaning tank.
Figure 8:
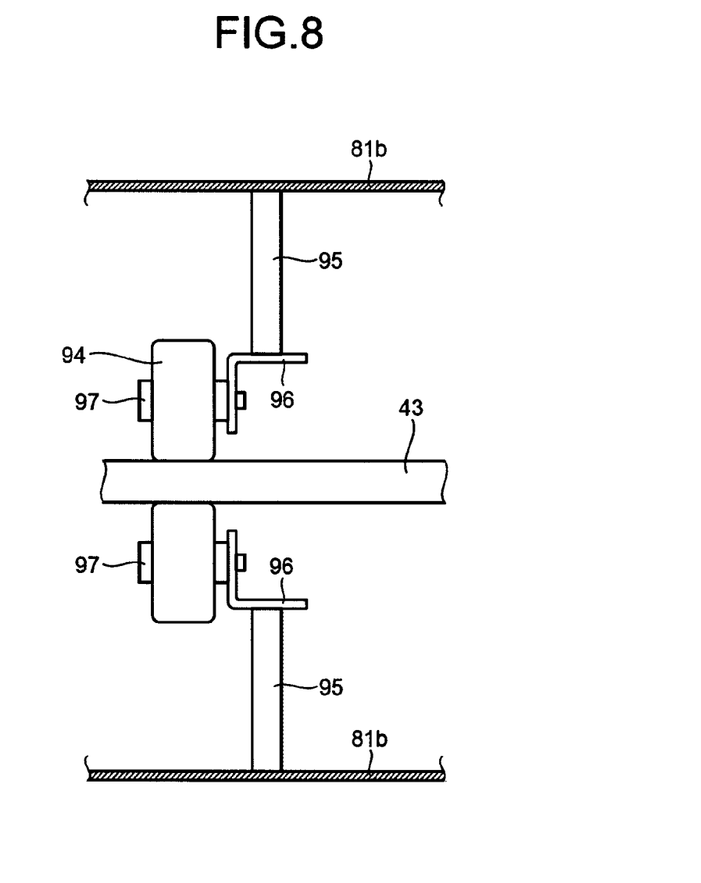
FIG. 8 is a schematic view of a guide roller.
Figure 9:
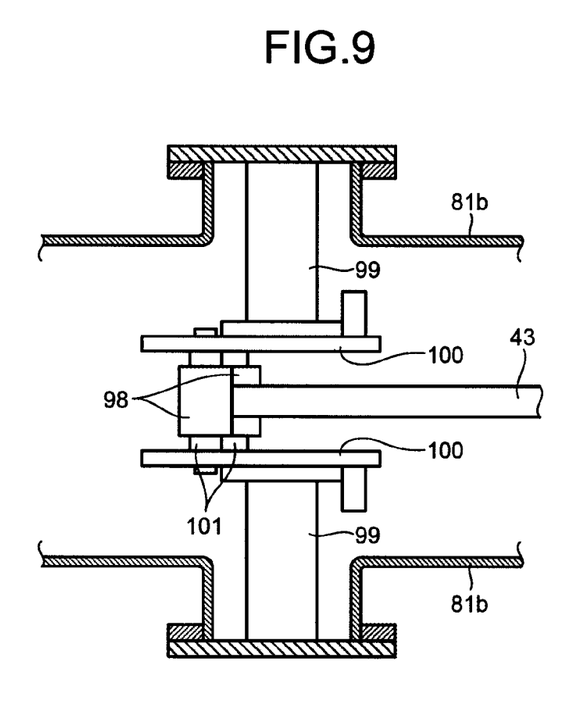
FIG. 9 is a schematic diagram of an auxiliary roller.
Figure 11:
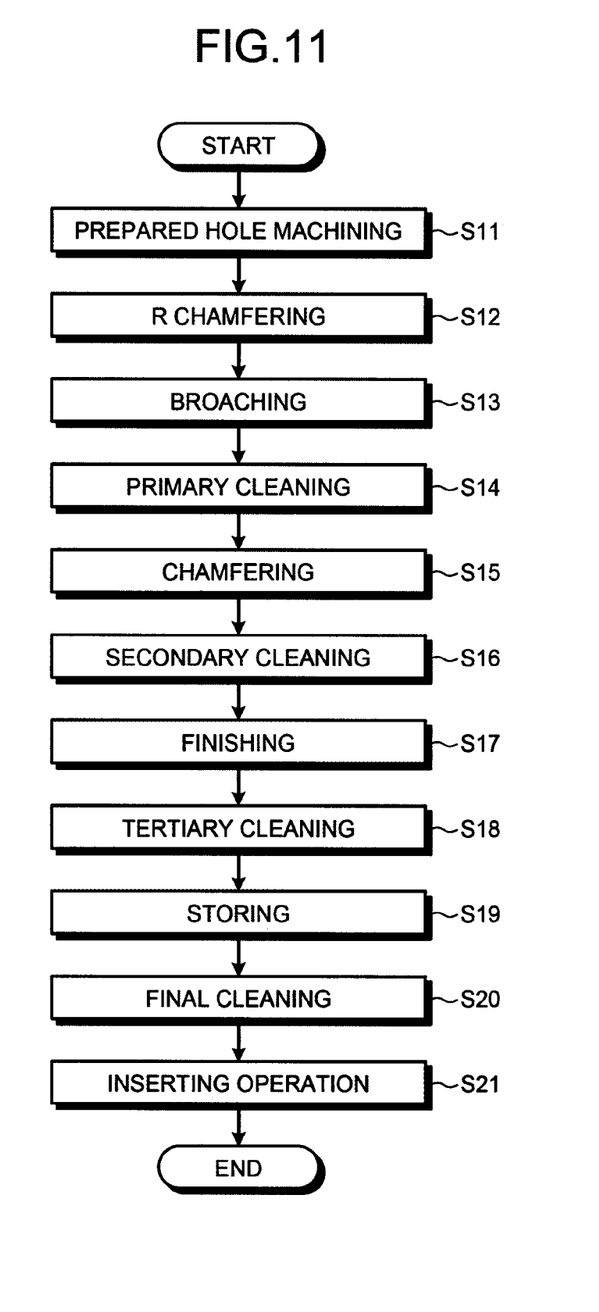
FIG. 11 is a flow chart illustrating a method of manufacturing a tube support plate.
Figure 12:
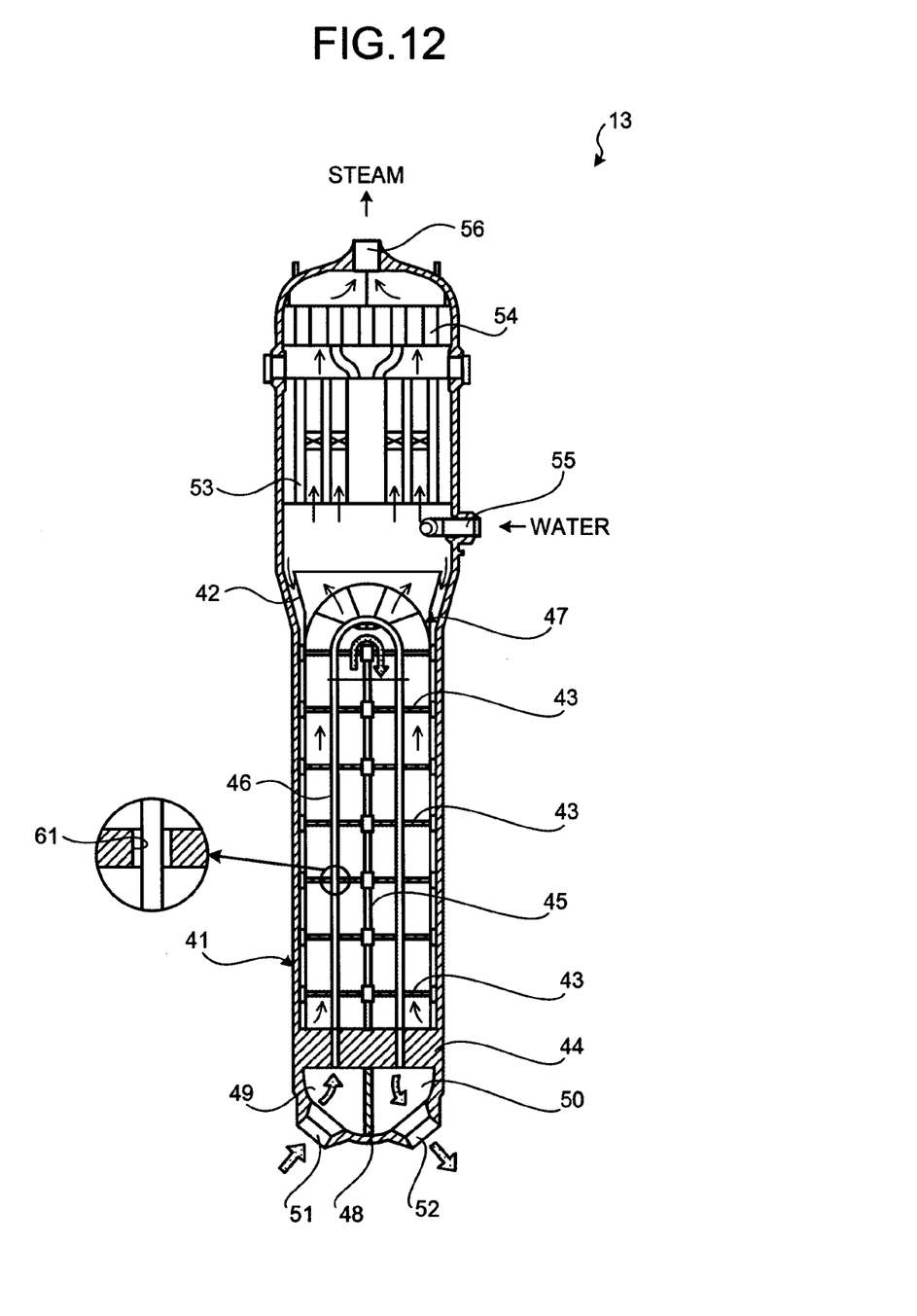
FIG. 12 is a schematic block diagram illustrating a steam generator of this embodiment.

FIG. 1 is a front view of a cleaning device of the porous plate for nuclear power according to an embodiment of the present invention, FIG. 2 is a plan view of the cleaning device of the porous plate for nuclear power of this embodiment, FIG. 3 is a side view of the cleaning device of the porous plate for nuclear power of this embodiment, FIG. 4 is a cross-sectional view of the cleaning tank in the cleaning device of the porous plate for nuclear power of this embodiment, FIG. 5 is a front view illustrating a rotation device of the cleaning tank, FIG. 6 is a side view of the cleaning tank, FIG. 7 is a plan view of the cleaning tank, FIG. 8 is a schematic view of a guide roller, FIG. 9 is a schematic diagram of an auxiliary roller, FIG. 10-1 is a plan view illustrating a prepared hole of a tube support plate, FIG. 10-2 is a plan view illustrating a prepared hole and an R chamfered portion of the tube support plate, FIG. 10-3 is a plan view illustrating a broached hole of the tube support plate, FIG. 11 is a flow chart illustrating a method of manufacturing a tube support plate, and FIG. 12 is a schematic block diagram illustrating a steam generator of this embodiment.

The nuclear reactor of this embodiment is a pressurized water reactor (PWR) that uses light water as reactor coolant and neutron moderator to be high-temperature and high-pressure water that does not boil through the entire reactor internal, sends the high-temperature and high-pressure water to the steam generator to generate steam by heat exchange, and sends the steam to the turbine generator to generate electricity.

In a nuclear power plant having the pressurized water reactor of this embodiment, the pressurized water reactor and the steam generator are housed in a reactor containment vessel, and the pressurized water reactor and the steam generator are connected to each other via a cooling water pipe. Therefore, the primary cooling water is heated by fuel (atomic fuel), and the high-temperature primary cooling water is sent to the steam generator via the cooling water pipe. Heat exchange between the high-pressure and high-temperature primary cooling water and the secondary cooling water is performed in the steam generator, and the cooled primary cooling water is returned to the pressurized water reactor through the cooling water pipe.

In the steam generator 13 applied to the nuclear power plant thus configured, as illustrated in FIG. 12, a body portion 41 has a closed hollow cylindrical shape, and a lower part thereof has a slightly smaller diameter than an upper part. A tube bundle shroud 42 having a cylindrical shape at a predetermined interval from an inner wall surface is provided in the lower part of the body portion 41. A plurality of tube support plates 43 is disposed inside the tube bundle shroud 42 in response to a predetermined height position, a tube sheet 44 is fixed below the tube support plate 43, and each of the tube support plates 43 is supported by a plurality of stay rods 45 that extends upward from the tube sheet 44. Moreover, a heat exchanger tube group 47 formed of a plurality of heat exchanger tubes 46 having an inverted U-shape is provided inside the tube bundle shroud 42, end portions of each of the heat exchanger tubes 46 are expanded and supported by the tube sheet 44, and intermediate portions thereof are supported by the tube support plates 43.

Further, the body portion 41 is partitioned into an entrance chamber 49 and an exit chamber 50 by a partition 48 below the tube sheet 44, is formed with an inlet nozzle 51 and an outlet nozzle 52, one end portions of each of the heat exchanger tubes 46 are in communication with the entrance chamber 49, and the other end portions thereof are in communication with the exit chamber 50.

Further, the body portion 41 is provided with a gas-water separator 53 that separates the water supply into steam and hot water above the heat exchanger tube group 47, and a moisture separator 54 that removes the moisture of the separated steam to be a state close to the dry steam. Further, a water supply tube 55 configured to perform the water supply of secondary cooling water is inserted into the body portion 41 between the heat exchanger tube group 47 and the gas-water separator 53, and a steam outlet 56 is formed in a ceiling portion. Moreover, the body portion 41 is provided with a water supply passage. The secondary cooling water supplied to the interior from the water supply tube 55 flows down between the water supply passage and the tube bundle shroud 42 and circulates upward at the tube sheet 44, and when rising inside the heat exchanger tube group 47, heat exchange between the secondary cooling water and the hot water (primary cooling water) flowing through each heat exchanger tube 46 is performed.

Therefore, the primary cooling water heated by the pressurized water reactor is sent to the entrance chamber 49 of the steam generator 13 through the cooling water pipe, circulates through the multiple heat exchanger tubes 46, and leads to the exit chamber 50. Meanwhile, the secondary cooling water cooled by the condenser is sent to the water supply tube 55 of the steam generator 13 through the cooling water pipe, and is subjected to heat exchange with the hot water (primary cooling water) flowing in the heat exchanger tube 46 through the body portion 41. That is, heat exchange between the high-pressure and high-temperature primary cooling water and the secondary cooling water is performed inside the body portion 41, and the cooled primary cooling water is returned to the pressurized water reactor from the exit chamber 50 through the cooling water pipe. Meanwhile, the secondary cooling water subjected to heat exchange with the high-pressure and high-temperature primary coolant rises inside the body portion 41, is separated into steam and hot water in the gas-water separator 53, and is sent to the steam turbine through the cooling water pipe after removing the moisture of the steam in the moisture separator 54.

In the steam generator 13 having the above-described configuration, a plurality of tube support plates 43 is provided at the lower part of the body portion 41 at predetermined intervals, and the tube sheet 44 is provided at the lower end portion thereof. Moreover, the end portions of the plurality of heat exchanger tubes 46 forming the heat exchanger tube group 47 are fixed to the multiple mounting holes formed on the tube sheet 44, and the intermediate portions thereof are supported by the multiple mounting holes 61 formed in each of the tube support plates 43. Since it is necessary to convey the secondary cooling water (steam) heated by the primary cooling water to the upper part, the respective mounting holes 61 of the respective tube support plates 43 have the different forms that have a plurality of notches on the outer peripheral side of the circular form as the cross-sectional shape of the heat exchanger tube 46.

Figure 101:
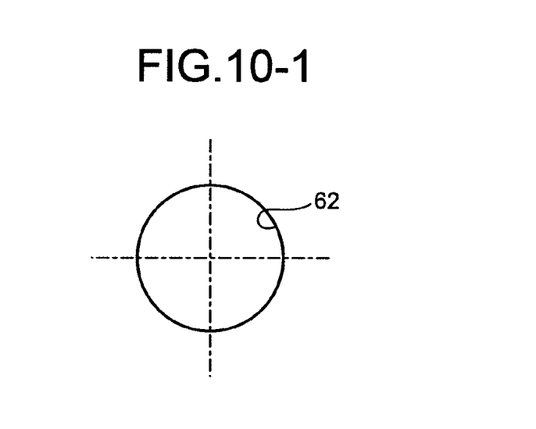
Figure 102:
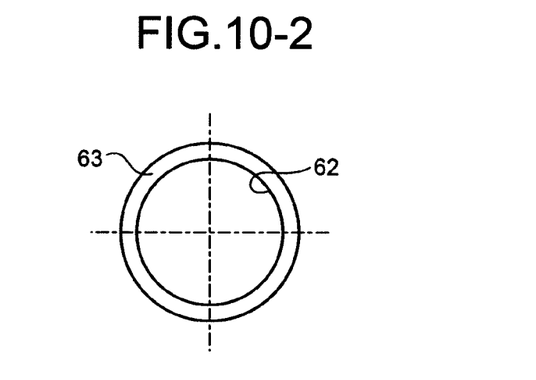
Figure 103:
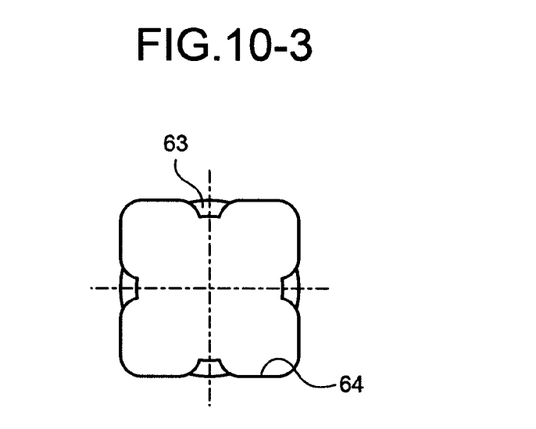

First, in the plurality of mounting holes 61 formed in the tube support plate 43, first, as illustrated in FIG. 10-1, by performing the prepared hole machining on the tube support plate 43 by a prepared hole machining device, a prepared hole 62 is formed. Next, as illustrated in FIG. 10-2, by performing the R chamfering on the end portion in the axial direction of the prepared hole 62 by the R chamfering device, an R chamfered portion 63 is formed. Next, as illustrated in FIG. 10-3, by broaching the prepared hole 62 by the broaching device, broached holes 64 having the different shapes are formed. Moreover, by chamfering the end portion in the axial direction of the broached holes 64 by the polishing apparatus of this embodiment, the mounting hole 61 is formed. The tube support plate 43 is cleaned after various types of machining are performed.

As illustrated in FIGS. 1 to 3, a cleaning device 71 of the porous plate for nuclear power of this embodiment cleans the tube support plate as a porous plate, and has a first cleaning tank 72, a second cleaning tank 73, and a post-treatment chamber 74. The respective cleaning tanks 72 and 73, and the post-treatment chamber 74 are disposed at predetermined intervals. In this case, the cleaning liquid is stored inside the first and second cleaning tanks 72 and 73, after the prepared hole machining, the R chamfering, and broaching of the tube support plate 43 are performed, the tube support plate 43 is cleaned while being immersed in the first cleaning tank 72, and after chamfering of the tube support plate 43 is performed, the tube support plate 43 is cleaned while being immersed in the second cleaning tank 73. Meanwhile, after the first and second cleaning tanks 72 and 73 are used, rinsing and drying of the tube support plate 43 are performed in the post-treatment chamber 74.

The first and second cleaning tanks 72 and 73 have substantially the same configuration, and are arranged side by side. The lower portions of the first and the second cleaning tanks 72 and 73 have a semicircular shape, and the upper portions thereof have a rectangular shape. The first and the second cleaning tanks 72 and 73 are set to have an inner diameter and a thickness capable of housing the tube support plate 43. The post-treatment chamber 74 is arranged alongside the second cleaning tank 73, similarly, the lower portion thereof has a semicircular shape, and the upper portion thereof has a rectangular shape, and the post-treatment chamber 74 is set to have an inner diameter and a thickness capable of housing the tube support plate 43. A crane 75 is arranged above the respective cleaning tanks 72 and 73 and the post-treatment chamber 74 to freely move, and the crane 75 is able to hang the tube support plate 43 by a hook 76. Moreover, the tube support plate 43 is hung and supported by the crane 75, and is conveyed among the first cleaning tank 72, the second cleaning tank 73, and the post-treatment chamber 74.

In addition, a construction passage 77 and a stair 78 which allow an operator to move are provided around the respective cleaning tanks 72 and 73, and the post-treatment chamber 74.

The respective cleaning tanks 72 and 73, and the post-treatment layer 74 are described here, but since each of them has substantially the same configuration, the second cleaning tank 73 will be described in detail, and the first cleaning tank 72 and the post-treatment chamber 74 will not be described.

In the second cleaning tank 73, as illustrated in FIGS. 4 to 7, a cleaning tank main body 81 has a predetermined thickness so that the tube support plate 43 can be supported therein in a upright state, the lower portion thereof has a semicircular shape, and the upper portion thereof has a rectangular shape and is open. That is, the cleaning tank main body 81 includes a pair of vertical wall portions 81a, a pair of side wall portions 81b, and a lower casing portion 81c, and is formed with an opening 81d at an upper end portion thereof. Moreover, the cleaning tank main body 81 is fixed onto a base 82, is supported by a fixing bracket 83, has a width, a thickness, and a height greater than an outer diameter of the tube support plate 43, and is capable of storing the cleaning liquid therein.

The cleaning tank main body 81 is provided with a rotation device 84 capable of rotating the tube support plate 43 at the lower portion thereof. In the rotation device 84, on the base 82, left and right mounts 85 are fixed adjacent to the lower casing portion 81c on one side of the vertical wall portion 81a in the cleaning tank main body 81, driven shafts 87 are each rotatably supported on the mounts 85 by support brackets 86, and driven sprockets 88 are each integrally and rotatably fixed to the respective driven shafts 87. Moreover, a chain 89 is wound around the left and right driven sprockets 88 to allow the driven sprockets 88 to synchronously rotate. Further, on the base 82, a driving motor 90 is fixed to be situated between the left and right mounts 85, and a driving sprocket 91 is mounted on the drive shaft. Moreover, a chain 92 is wound around the driving sprocket 91 and one driven sprocket 88, thereby being able to transmit the driving force. Moreover, the left and right driven shafts 87, to which the driven sprockets 88 are fixed, horizontally penetrate the left and right vertical wall portions 81a, and the driving rollers 93a are fixed inside the cleaning tank main body 81, respectively. In this embodiment, two driving rollers 93 are provided, but one drive roller, or three or more drive rollers may be provided.

Therefore, when driving the driving motor 90, the driving sprocket 91 rotates, and the rotational force is transmitted to one driven sprocket 88 via the chain 92 to rotate the one driven sprocket 88. When one driven sprocket 88 rotates, the rotational force is transmitted to the other driven sprocket 88 to rotate the other driven sprocket 88. For that reason, the respective driving rollers 93 rotate via the driven shafts 87 by the rotational force of the respective driven sprockets 88, thereby being able to rotate the tube support plate 43.

At the upper portion of the cleaning tank main body 81, a plurality of first guide rollers (support roller) 94 is provided which prevents the collapse in the thickness direction of the tube support plate 43. That is, as illustrated in detail in FIG. 8, in the cleaning tank main body 81, a pair of support tubes 95 extends from the opposing positions of the upper inner wall surface of each side wall portion 81b, L-shaped mounting brackets 96 are fixed to each of the leading end portions, and the first guide rollers 94 are rotatably supported to the respective mounting brackets 96 by the support shafts 97 parallel to each other, respectively. The two first guide rollers 94 come into contact with the front part and the back part of the tube support plate 43, and can rotate while supporting the tube support plate 43 to interpose the tube support plate 43 therebetween.

Furthermore, at the lower portion of the cleaning tank main body 81, a plurality of second guide rollers (support roller) 98 is provided which prevents collapse in the radial direction of the tube support plate 43. That is, as illustrated in detail in FIG. 9, in the cleaning tank main body 81, a pair of support tubes 99 extends from the opposing positions of the lower inner wall surface of each side wall portion 81b, planar mounting brackets 100 are fixed to each of the leading end portions, and the second guide rollers 98 are rotatably supported by the two parallel support shafts 101 passing through the respective mounting brackets 100, respectively. The two second guide rollers 98 can rotate while supporting the outer peripheral end surface of the tube support plate 43 so as to abut against the outer peripheral end surface.

The first pair of guide rollers 94 is disposed at a predetermined interval in the lateral direction at the upper portion of the cleaning tank main body 81 to interpose the outer peripheral portion of the tube support plate 43, and by rotating synchronously with the rotation of the tube support plate 43, it is possible to prevent collapse in the thickness direction of the tube support plate 43. The second pair of guide rollers 98 is disposed at a predetermined interval in the lateral direction at the lower portion of the cleaning tank main body 81 to support the outer peripheral end surface part of the tube support plate 43, and by rotating synchronously with the rotation of the tube support plate 43, it is possible to prevent collapse in the radial direction of the tube support plate 43.

The cleaning tank main body 81 is provided with an ultrasonic wave oscillation device 111 that irradiates the tube support plate 43 supported therein with ultrasonic waves. That is, in the ultrasonic wave oscillation device 111, the support plate 112 is fixed to the outer wall surface of one vertical wall portion 81a of the cleaning tank main body 81, and a winch (moving device) 113 is installed on the support plate 112. In the respective winches 113, a traction rope 114 is pulled upward and enters the cleaning tank main body 81 via the guide rollers 115, and an ultrasonic transducer 116 is connected to the end portion of the traction rope 114. The ultrasonic transducers 116 are each disposed on the inner wall surface of the cleaning tank main body 81 to face the front part of the tube support plate 43 supported within the cleaning tank main body 81, and by operating the winch 113 to move the traction rope 114, the ultrasonic transducers 116 are movable in the vertical direction. Furthermore, a reflecting plate 117 is fixed to the cleaning tank main body 81 to face the ultrasonic transducer 116 along the vertical direction of the inner wall surface of the other vertical wall portion 81a.

Furthermore, two water tubes 121 are disposed at the intermediate portion in the vertical direction of the cleaning tank main body 81 along the horizontal direction. The two water tubes 121 are disposed to face the front part side and the back part side of the tube support plate 43, and are supported on the inner wall surface of each side wall portion 81b. Moreover, a supply tube (supply path) 122 passing through the side wall portion 81b of the cleaning tank main body 81 from the outside is connected to one end portion of each water tube 121, and the other end portion of each water tube 121 is closed. Further, the water tube 121 is provided with injection nozzles 123 at predetermined intervals along the longitudinal direction, and the injection direction of the respective injection nozzles 123 is the tube support plate 43 side, but the upper part and the lower part thereof are provided to alternately slope (for example, 45°).

Furthermore, at the intermediate portion in the vertical and horizontal directions of the cleaning tank main body 81, a first discharge tube (exhaust path) 124 is provided to pass through the side wall portion 81b from the outside. Furthermore, the cleaning tank main body 81 is provided with a second discharge tube (discharge path) 125 to pass through the bottom of the lower casing portion 81c. Moreover, a level gauge tube 126 is disposed on the side of the cleaning tank main body 81, and the lower portion of the level gauge tube 126 is connected to the lower portion of the cleaning tank main body 81 via an on-off valve 127 to be able to detect the storage amount of the cleaning liquid in the cleaning tank main body 81.

Moreover, the respective discharge tubes 124 and 125 are connected to a discharge pipe 137 having an on-off valve 135 and a strainer 136 via the pipes 133 and 134 having on-off valves 131 and 132, the discharge pipe 137 is connected to the supply pipe 139 via a pump 138, and the supply pipe 139 is provided with a valve 140 and is connected to the supply tube 122. Further, a storage tank 141 that stores the cleaning liquid is provided, a return pipe 142 to the storage tank 141 from the downstream side of the pump 138 is provided, and a refill pipe 143 to the upstream side of the pump 138 from the storage tank 141 is provided.

Therefore, when driving the pump 138, the cleaning liquid in the cleaning tank main body 81 is discharged from the respective discharge tubes 124 and 125 through the discharge pipe 137 after removing foreign substances in the cleaning liquid by the strainer 136, the cleaning liquid is supplied to each water tube 121 from the supply tube 122 through the supply pipe 139, and it is possible to supply the cleaning liquid into the cleaning tank main body 81 from the plurality of injection nozzles 123.

Furthermore, at the lower portion of the cleaning tank main body 81, a heating device 151 that heats the cleaning liquid is provided. The heating device 151 is, for example, an electrical heater, and a heating unit 152 is inserted into the heating device 151 from the lower casing portion 81c of the cleaning tank main body 81. This heating device 151 enables the cleaning liquid in the cleaning tank main body 81 to be heated, and enables the cleaning liquid in the cleaning tank main body 81 to be stirred by generating convection in the cleaning liquid.

In addition, the first cleaning tank 72 has substantially the same configuration as the above-described second cleaning tank 73, but the post-treatment chamber 74 may be provided with a shower device (rinsing device) and an air blower, although not illustrated, rather than the supply path and the discharge path of the cleaning liquid.

As described above, as illustrated in FIG. 11, at step S11, the tube support plate 43 performs the prepared hole machining on the tube support plate 43 by the prepared hole machining device to form the prepared hole 62. At step S12, by performing the R chamfering on the end portion in the axial direction of the prepared hole 62 by the R chamfering device, the R chamfered portion 63 is formed. At step S13, by broaching the prepared hole 62 by the broaching device, the broached holes 64 having the different shapes are formed. At step S14, primary cleaning of the tube support plate 43 is performed by the first cleaning tank 72 of the cleaning device 71. At step S15, by chamfering the end portion in the axial direction of the broached hole 64 by the polishing apparatus, the mounting holes 61 are formed. At step S16, secondary cleaning of the tube support plate 43 is performed by the second cleaning tank 73 of the cleaning device 71. At step S17, after performing various inspections as finishing, at step S18, tertiary cleaning of the tube support plate 43 is performed by the second cleaning tank 73 of the cleaning device 71, and at step S19, the tube support plate 43 is stored. Moreover, at a predetermined time, at step S20, final cleaning of the tube support plate 43 is performed by the second cleaning tank 73 and the post-treatment chamber 74 of the cleaning device 71, and at step S21, an inserting operation of the tube support plate 43 with respect to the body portion (lower portion) 41 is performed.

Here, in the primary cleaning, the secondary cleaning, and the tertiary cleaning using the cleaning device 71, the tube support plate 43 is merely immersed in the cleaning liquid in the first cleaning tank 72 or the second cleaning tank 73, and, in the final cleaning using the cleaning device 71, the tube support plate 43 rotates and is irradiated with ultrasonic waves while being immersed in the cleaning liquid of the second cleaning tank 73.

That is, in the final cleaning using the cleaning device 71, as illustrated in FIGS. 4 to 7, the tube support plate 43 is lifted by the crane 75 and is inserted into the second cleaning tank 73. Then, the lower portion of the tube support plate 43 is supported by the driving roller 93 within the cleaning tank main body 81, the upper portion thereof is supported by the first guide roller 94, and the side portion thereof is supported by the second guide roller 98. In this case, a predetermined quantity of cleaning liquid is stored within the cleaning tank main body 81, and the tube support plate 43 is immersed in the cleaning liquid. In this state, by driving the driving motor 90 to rotate the driving roller 93, the supported tube support plate 43 is rotated. At this time, since the upper portion of the tube support plate 43 is interposed by the first guide rollers 94, and the side portion thereof is interposed by the second guide rollers 98, the tube support plate 43 stably rotates without collapsing.

Furthermore, the tube support plate 43 rotates within the cleaning tank main body 81, and simultaneously, by operating the winch 113 to move the traction rope 114 back and forth, the ultrasonic transducer 116 is moved back and forth along the vertical direction. Then, ultrasonic waves from the ultrasonic transducer 116 are diffused at a predetermined angle and radiated to the front part of the tube support plate 43, a part of the ultrasonic waves from the ultrasonic transducer 116 reaches the reflecting plate 117 through each mounting hole 61 of the tube support plate 43, and the ultrasonic waves reflected by the reflecting plate 117 are irradiated to the back part of the tube support plate 43. Therefore, foreign substances such as cutting oil or chips or dust adhering to the front part and the back part are peeled off the tube support plate 43 by the cavitation effect.

At this time, since the cleaning liquid in the cleaning tank main body 81 is heated by the heating device 151, and the cleaning liquid is stirred by the generated convection, the cleaning effect of the tube support plate 43 is improved.

Further, if necessary, the pump 138 is driven to discharge the cleaning liquid in the cleaning tank main body 81 from each of the discharge tubes 124 and 125 and remove the foreign substances within the cleaning liquid by the strainer 136, and the cleaning liquid is supplied to each water tube 121 from the supply tube 122 and is injected into the cleaning tank main body 81 from the plurality of injection nozzles 123. Moreover, the cleaning liquid to the cleaning tank main body 81 is replenished according to the display of the level gauge tube 126.

By cleaning the tube support plate 43 within the second cleaning tank 73 at a predetermined time, the foreign substances such as cutting oil, chips, or dust adhering to the front part and the back part are removed, and the final cleaning is completed.

In addition, in the cleaning device 71, the tube support plate 43 is merely immersed in the cleaning liquid in the first cleaning tank 72, and in the post-treatment chamber 74, the rinsing process using the shower device (rinsing device) and the drying process using the air blower are merely performed on the tube support plate 43. Thus, the driving roller 93, the respective guide rollers 94 and 98, the ultrasonic transducer 111 and the like may not be provided.

The cleaning device of the porous plate for nuclear power of this embodiment is provided with the cleaning tanks 72 and 73 that are capable of storing the cleaning liquid therein and capable of housing the tube support plate 43 in the upright state, the rotation device 84 that is capable of rotating the tube support plate 43 in each of the cleaning tanks 72 and 73, and the ultrasonic transducer 111 that irradiates the tube support plate 43 in the cleaning tanks 72 and 73 with ultrasonic waves.

Therefore, the tube support plate 43 is immersed in the cleaning liquid in the cleaning tanks 72 and 73 and is rotated by the rotation device 84 in the upright state, and the ultrasonic waves is radiated from the ultrasonic transducer 111 to remove the adhered cutting oil, chips, dust and the like. Thus, it is possible to efficiently remove the adhered foreign substances.

Further, in the cleaning device of the porous plate for nuclear power of this embodiment, as the ultrasonic wave oscillation device 111, the ultrasonic transducer 116 disposed on the inner wall surface of the cleaning tanks 72 and 73 to face the front part of the tube support plate 43, and the reflecting plate 117 disposed on the inner wall surface of the cleaning tanks 72 and 73 to face the back part of the tube support plate 43 are fixed, and the ultrasonic transducer 116 is movable along the vertical direction by the winch 113. Accordingly, since the tube support plate 43 is irradiated with the ultrasonic waves from the ultrasonic transducer 116 moving in the vertical direction while rotating and the reflecting plate 117, in the upright state of being immersed in the cleaning liquid in the cleaning tanks 72 and 73, it is possible to remove the cutting oil, chips, dust and the like over the entire surface of the tube support plate 43, thereby improving the cleaning efficiency, and the ultrasonic wave oscillation device 111 can be miniaturized, thereby miniaturizing the device and reducing the cost.

Further, in the cleaning device of the porous plate for nuclear power of this embodiment, the plurality of driving rollers 93 forming the rotation device 84 is provided at the lower portion of the cleaning tanks 72 and 73, and the first guide roller 94 and the second guide roller 98 are provided at the upper portion of the cleaning tanks 72 and 73, as a plurality of support rollers that prevents the collapse of the tube support plate 43. In this case, the first guide roller 94 supports the front part and the back part of the tube support plate 43, and the second guide roller 98 supports the outer peripheral end surface of the tube support plate 43. Accordingly, the tube support plate 43 is rotatable by the plurality of driving rollers 93 provided at the lower portion, and the tube support plate 43 is supported by the first pair of guide rollers 94 provided at the upper portion and the second guide rollers 98 provided at the intermediate portion to rotate in a state of being prevented from collapsing. Accordingly, it is possible to safely and efficiently clean the tube support plate 43.

Further, the cleaning device of the porous plate for nuclear power of this embodiment is provided with the heating device 151 that heats the cleaning liquid, at the lower portion of the cleaning tanks 72 and 73. Therefore, since the cleaning liquid in the cleaning tanks 72 and 73 is heated by the heating device 151, the cleaning effect of the cleaning liquid is improved, and since the cleaning liquid is stirred by convection, it is also possible to improve the cleaning effect of the tube support plate 43 in this regard.

Further, the cleaning device of the porous plate for nuclear power of this embodiment is provided with the water tube 121 and the supply tube 122 that supply the cleaning liquid into the cleaning tanks 72 and 73, and the discharge paths 124, 125 that discharge the cleaning liquid in the cleaning tanks 72 and 73. Therefore, it is possible to supply the cleaning liquid to the cleaning tanks 72 and 73 and discharge the cleaning liquid in the cleaning tanks 72 and 73, thereby being able to improve the cleaning effect by circulating the cleaning liquid, and to suppress the contamination of the cleaning liquid in the cleaning tank.

In addition, in the above-described embodiments, the shapes of the cleaning tanks 72 and 73 are not limited to the embodiments, and as long as it is possible to immerse the tube support plate 43 in the cleaning liquid, any shape may be used. Furthermore, the cleaning tanks 72 and 73 can house one tube support plate 43, but the cleaning tanks 72 and 73 may house a plurality of tube support plates 43.

Further, in this embodiment, as the ultrasonic wave oscillation device 111, the ultrasonic transducer 116 and the reflecting plate 117 are provided, and the ultrasonic transducer 116 is movable along the vertical direction by the winch 113, but is limited to this configuration. For example, the ultrasonic transducer 116 may be disposed on each of the inner wall surfaces of the cleaning tanks 72 and 73. Furthermore, the ultrasonic transducer 116 may be fixed without being movable. In addition, the ultrasonic transducer 116 and the reflecting plate 117 may be movable by the winch 113.

Further, in this embodiment, the porous plate for nuclear power was described by applying the tube support plate 43 of the steam generator 13 of the nuclear power plant having the pressurized water reactor, but is not limited thereto. For example, the porous plate for nuclear power may be applied to a flow distribution plate provided between the tube support plate 43 and the tube sheet 44 in the steam generator 13, a plurality of baffle plates fixed within a superheater and an evaporator in a nuclear power plant having a fast breeder reactor at predetermined intervals, a porous plate used in the nuclear power plant having a boiling type reactor or the like.

REFERENCE SIGNS LIST

13 STEAM GENERATOR
41 BODY PORTION
43 TUBE SUPPORT PLATE
44 TUBE SHEET
61 MOUNTING HOLE
62 PREPARED HOLE
63 R CHAMFERED PORTION
64 BROACHED HOLE
71 CLEANING DEVICE OF POROUS PLATE FOR NUCLEAR POWER
72 FIRST CLEANING TANK
73 SECOND CLEANING TANK
74 POST-TREATMENT CHAMBER
81 CLEANING TANK MAIN BODY
84 ROTATION DEVICE
90 DRIVING MOTOR
93 DRIVE ROLLER
94 FIRST GUIDE ROLLER (SUPPORT ROLLER)
98 SECOND GUIDE ROLLER (SUPPORT ROLLER)
111 ULTRASONIC WAVE OSCILLATION DEVICE
113 WINCH (MOVING DEVICE)
116 ULTRASONIC TRANSDUCER
117 REFLECTING PLATE
122 SUPPLY TUBE (SUPPLY PATH)
124 FIRST DISCHARGE TUBE (DISCHARGE PATH)
125 SECOND DISCHARGE TUBE (DISCHARGE PATH)
151 HEATING DEVICE

The invention claimed is:

1. A cleaning device of a porous plate for nuclear power comprising:
    a cleaning tank that is capable of storing a cleaning liquid therein and is capable of housing the porous plate in an upright state;
    a rotation device that is capable of rotating the porous plate within the cleaning tank; and
    an ultrasonic wave oscillation device that irradiates the porous plate within the cleaning tank with ultrasonic waves, wherein
    the ultrasonic wave oscillation device includes an ultrasonic transducer that is disposed on an inner wall surface of the cleaning tank to face one of a front part and a back part of the porous plate, and a reflecting plate that is disposed on the inner wall surface of the cleaning tank to face the other of the front part or the back part, and
    the cleaning device further comprises a moving device from which a traction rope is pulled upward and enters the cleaning tank via guide rollers to be connected to the ultrasonic transducer such that the ultrasonic transducer is provided to be movable along a vertical direction by the moving device, and
    the reflecting plate is fixed to the inner wall surface of the cleaning tank at an opposed side to the ultrasonic transducer.

2. The cleaning device according to claim 1,
wherein a plurality of drive rollers forming the rotation device is provided at a lower portion of the interior of the cleaning tank, and a plurality of support rollers configured to prevent collapse of the porous plate is provided at an upper portion of the interior of the cleaning tank.

3. The cleaning device according to claim 2,
wherein the support rollers include a first pair of guide rollers that supports the front part and the back part of the porous plate, and a second pair of guide rollers that supports an outer peripheral end surface of the porous plate.

4. The cleaning device according to claim 1,
wherein a heating device configured to heat the cleaning liquid is provided at the lower portion of the interior of the cleaning tank.

5. The cleaning device according to claim 1,
wherein a supply path configured to supply the cleaning liquid to the interior of the cleaning tank, and a discharge path configured to discharge the cleaning liquid within the cleaning tank.

\* \* \* \* \*